(12) United States Patent
Hall et al.

(10) Patent No.: US 8,031,621 B2
(45) Date of Patent: Oct. 4, 2011

(54) HYBRID TIME TRIGGERED ARCHITECTURE FOR DUAL LANE CONTROL SYSTEMS

(75) Inventors: Brendan Hall, Eden Prairie, MN (US); Joseph M. Horvath, Scottsdale, AZ (US); Brian J. Sellner, Tuscson, AZ (US)

(73) Assignee: Honeywell International Inc., Morristown, NJ (US)

( * ) Notice: Subject to any disclaimer, the term of this patent is extended or adjusted under 35 U.S.C. 154(b) by 436 days.

(21) Appl. No.: 11/835,197

(22) Filed: Aug. 7, 2007

(65) Prior Publication Data

US 2009/0041040 A1    Feb. 12, 2009

(51) Int. Cl.
*H04L 12/26* (2006.01)
*H04B 7/212* (2006.01)

(52) U.S. Cl. .......................................... 370/246; 370/442
(58) Field of Classification Search .................. 370/246, 370/247, 250, 251, 400, 401, 442
See application file for complete search history.

(56) References Cited

U.S. PATENT DOCUMENTS

| | | | | |
|---|---|---|---|---|
| 4,701,756 A * | 10/1987 | Burr | ......................... | 340/825.02 |
| 4,942,570 A * | 7/1990 | Kotzin et al. | .................. | 370/263 |
| 5,027,342 A * | 6/1991 | Boulton et al. | ................ | 370/225 |
| 5,748,616 A * | 5/1998 | Riley | ............................. | 370/242 |
| 6,466,557 B1 * | 10/2002 | Doi | ................................. | 370/332 |
| 6,639,895 B1 * | 10/2003 | Helles et al. | ................... | 370/219 |
| 7,209,435 B1 * | 4/2007 | Kuo et al. | ...................... | 370/219 |
| 7,542,412 B2 * | 6/2009 | Rausch et al. | ................. | 370/216 |
| 2001/0032042 A1 * | 10/2001 | Disser et al. | ..................... | 701/48 |
| 2007/0113146 A1 * | 5/2007 | Li et al. | ......................... | 714/758 |

OTHER PUBLICATIONS

"The X-by-Wire Concept: Time-Triggered Information Exchange and Fail Silence Support by new System Services," Dilger, Elmar et al., 1997, Society of Automotive Engineers, Inc.
"Honeywell Production F1254 with MAC Based FADEC Makes its First Flight in Aermacchi 346 Trainer," Honeywell release, Phoenix, Apr. 11, 2005.
Fast TTP Communication Controller—C2NF, Soft Core (RTL IP), Feb. 25, 2005, Version 1.0, TTChip Entwicklungsges.m.b.H.

* cited by examiner

*Primary Examiner* — Hong Cho
(74) *Attorney, Agent, or Firm* — Fogg & Powers LLC

(57) ABSTRACT

A network for a dual lane control system is provided. The network comprises at least one hub for a first channel and at least one hub for a second channel. A first plurality of end nodes is in a first lane. Each of the first plurality of end nodes is coupled to the first and second channels by being in communication with the hubs for the first and second channels. A second plurality of end nodes in a second lane are each redundant with a respective end node in the first lane. Each of the second plurality of end nodes is coupled to the first and second channels by being in communication with the hubs for the first and second channels.

19 Claims, 3 Drawing Sheets

HYBRID TIME TRIGGERED ARCHITECTURE FOR DUAL LANE CONTROL SYSTEMS

BACKGROUND

Distributed fault-tolerant communication systems are used in applications where a failure could possibly result in injury or death to one or more persons. Such applications are referred to as "safety-critical applications." One example of a safety-critical application is in a system that is used to monitor and manage sensors and actuators included in an airplane or other aerospace vehicle. These applications can be run on various network computing architectures having a plurality of nodes. In a network computing architecture, a "node" is typically a processing location such as a computer or other data processing device.

A computing architecture that is commonly considered for use in safety-critical applications is the time-triggered architecture (TTA). In a TTA system, multiple nodes in a network communicate with one another over two replicated high-speed communication channels using, for example, the Time Triggered Protocol/C (TTP/C) or the FLEXRAY protocol. In some implementations, at least one of the nodes in such a TTA system is coupled to one or more sensors and/or actuators over two replicated, low-speed serial communication channels using, for example, the Time Triggered Protocol/A (TTP/A). Traditional time-triggered systems replicate the buses for increased communication availability and require the nodes of the system to transmit simultaneously on both buses.

Various fault-tolerant control systems have been developed for safety critical applications. For example, the full authority digital electronic control (FADEC) system includes a computer and related accessories that control all aspects of aircraft engine performance. Honeywell has developed a dual channel FADEC system based on its modular aerospace control (MAC) platform. The MAC-based FADEC uses the Time Triggered Protocol (TTP) for inter-module communication. The TTP removes the complex interdependencies among modules, and allows all modules in the system to see all data all of the time, ensuring seamless fault accommodation without complex channel-change logic. Using the TTP communications protocol, the MAC-based FADEC provides independence of safety critical functions in the engine.

The application of a time triggered network to a dual lane control system (e.g., the MAC-based FADEC) maps all of the system nodes onto a fail operational two channel network (e.g., TTP/C). This network requires complex bus guardians to protect the system against a lane failure that breaks both channels of the bus. The network bandwidth utilization is shared between all of the nodes, with each node transmitting redundant data on each of the network channels during an assigned time-division multiple access (TDMA) schedule slot. With the redundant functions of the nodes assigned to different slots, this approach requires the software of each lane to be different to account for the slot mapping.

SUMMARY

The present invention is related to a network for a dual lane control system. The network comprises at least one hub for a first channel and at least one hub for a second channel. A first plurality of end nodes is in a first lane. Each of the first plurality of end nodes is coupled to the first and second channels by being in communication with the hubs for the first and second channels. A second plurality of end nodes in a second lane are each redundant with a respective end node in the first lane. Each of the second plurality of end nodes is coupled to the first and second channels by being in communication with the hubs for the first and second channels.

BRIEF DESCRIPTION OF THE DRAWINGS

Features of the present invention will become apparent to those skilled in the art from the following description with reference to the drawings. Understanding that the drawings depict only typical embodiments of the invention and are not therefore to be considered limiting in scope, the invention will be described with additional specificity and detail through the use of the accompanying drawings, in which.

DETAILED DESCRIPTION

Figure 1:
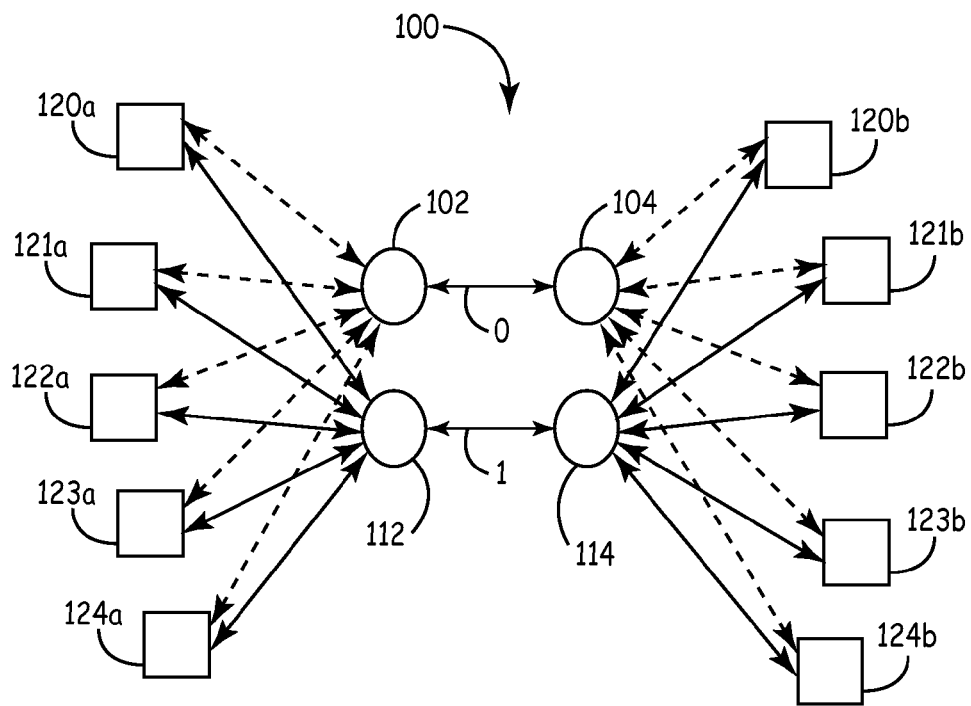
FIG. 1 depicts one embodiment of a network that can be used in a dual lane control system.

In the following description, various embodiments of the present invention may be described in terms of various computer architecture elements and processing steps. It should be appreciated that such elements may be realized by any number of hardware or structural components configured to perform specified operations. Further, it should be noted that although various components may be coupled or connected to other components within exemplary system architectures, such connections and couplings can be realized by direct connection between components, or by connection through other components and devices located therebetween. The following detailed description is, therefore, not to be taken in a limiting sense.

In general, the present invention is directed to a hybrid time-triggered network architecture that provides an inter-lane node mapping and scheduling approach for dual lane control systems and methods used in hub-based network architectures. The nodes of each lane are mapped onto separate channels of the time-triggered network. The time-triggered network uses time-division multiple access (TDMA) protocol with the added capability to simultaneously transmit and receive within the same time slot using different channels, with one channel for transmitting and the other channel for receiving. The present approach arranges the redundant nodes of the system such that they share the same time slot, but transmit on separate channels of the network. This enables the network capacity to be effectively doubled, and also halves the network transport latency.

The time-triggered network improves global synchronization and reduces the software complexity, while retaining the required lane independence via the mapping of control lanes into different channels of the network. Although the control lanes are independent, the control system achieves very tight global synchronization across the network, since all of the nodes of the network are mutually synchronized. In addition, the present approach enables the software on each lane of the control system to be identical, which can dramatically reduce software costs by lowering certification expenses, and easing repair and maintenance.

With the present inter-lane node mapping approach, a node can be swapped from one lane to another without change, and the bandwidth of the control system is effectively doubled.

The lane/channel mapping lessens the requirement for bus guardians, since cross lane fault propagation is architecturally mitigated.

The present approach may be employed within any dual lane control system that uses a time-triggered network, such as a full authority digital electronic control (FADEC) modular aerospace control (MAC) system, or a cabin pressure control system. The present approach provides simplification and performance improvement in such dual lane control systems. This approach also enables high integrity wireless dual lane controls.

Further details of the present invention are described as follows with respect to the drawings.

FIG. 1 depicts a network 100 that can be used in a dual lane control system. The network 100 has a first hub 102 coupled to a second hub 104 to form a first channel 0. A third hub 112 is coupled with a fourth hub 114 to form a second channel 1. In an alternative embodiment, the first and second hubs 102, 104 can be replaced with a single hub. Likewise, the third and fourth hubs 112, 114 can also be replaced with another single hub. The hubs can be used to enforce various temporal policies (e.g., enforce the TDMA schedule).

The network 100 has a first plurality of end nodes 120a, 121a, 122a, 123a, 124a in a first lane, and a second plurality of redundant end nodes 120b, 121b, 122b, 123b, 124b in a second lane. Accordingly, end node 120a is redundant with end node 120b so as to form a pair of redundant end nodes, end node 121a is redundant with end node 121b, and so forth. Each of the end nodes is coupled to both channels 0 and 1 via the appropriate hubs. Thus, for example, end node 120a is coupled to channel 0 by being in communication with hub 102, and end node 120a is coupled to channel 1 by being in communication with hub 112. Likewise, redundant end node 120b is coupled to channel 0 by being in communication with hub 104, and end node 120b is coupled to channel 1 by being in communication with hub 114. The other end nodes are coupled to channels 0 and 1 in the same fashion.

In the present dual lane mapping approach, each end node in a pair of redundant end nodes can be cluster mapped into the same time slot by utilizing a single physical layer for each node. Thus, for a given transmission schedule, each end node in the pair of redundant end nodes is respectively mapped into the same time slot in channels 0 and 1.

Figure 2:
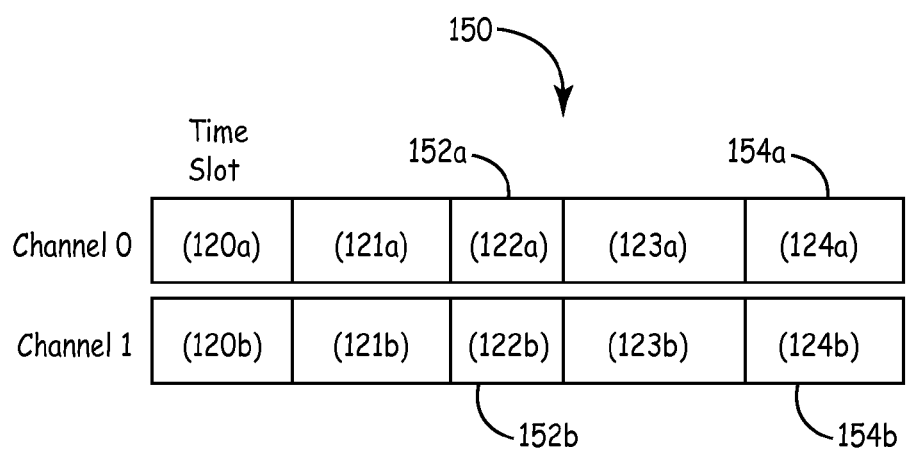
FIG. 2 is a representative transmission schedule for use in the network shown in FIG. 1.

A representative transmission schedule 150 for use in network 100 is shown in FIG. 2. For channel 0 and channel 1, a packet 152a (for node 122a) and a packet 152b (for node 122b) both transmit in the same time slot, a packet 154a (for node 124a) and a packet 154b (for node 124b) also both transmit in the same time slot, and so forth.

The subsequent data flow is enforced by the scheduling table of the appropriate hub. It should be noted that a strict lane to channel mapping may not be required, and the transmission channel of a lane need not be fixed. Avoiding fixed channel mapping can increase overall system availability in the event of a faulty "fail passive" hub.

It should also be noted that each "replicated" packet or message from a node will be automatically in the same time slot. Thus, the agreement functions may be greatly simplified since they are relieved of the burden from collecting data across several time slots. This may also simplify the scheduling complexity, which will also be relieved by the increase in bandwidth capacity. In addition, the serialization delay of the data transport is also reduced, hence the subsequent task timing constraints on application tasks should also be relieved.

In addition, membership can be calculated independently for each end node in a time slot. Lane control can be achieved through software awareness of the membership and associated clique formation.

If a distributed clock synchronization using TTP or FLEXRAY is performed, the nodes in the present system can calculate the average of the values they receive from both channels before applying the result to the clock synchronization equation.

The present protocol is also immune to noise on one of the channels. While the present method using TTP/C is one option, other options can be utilized. For example, rather than wait for silence to pace transmissions (i.e., before start-up), the absence of valid traffic may also be used.

Figure 3:
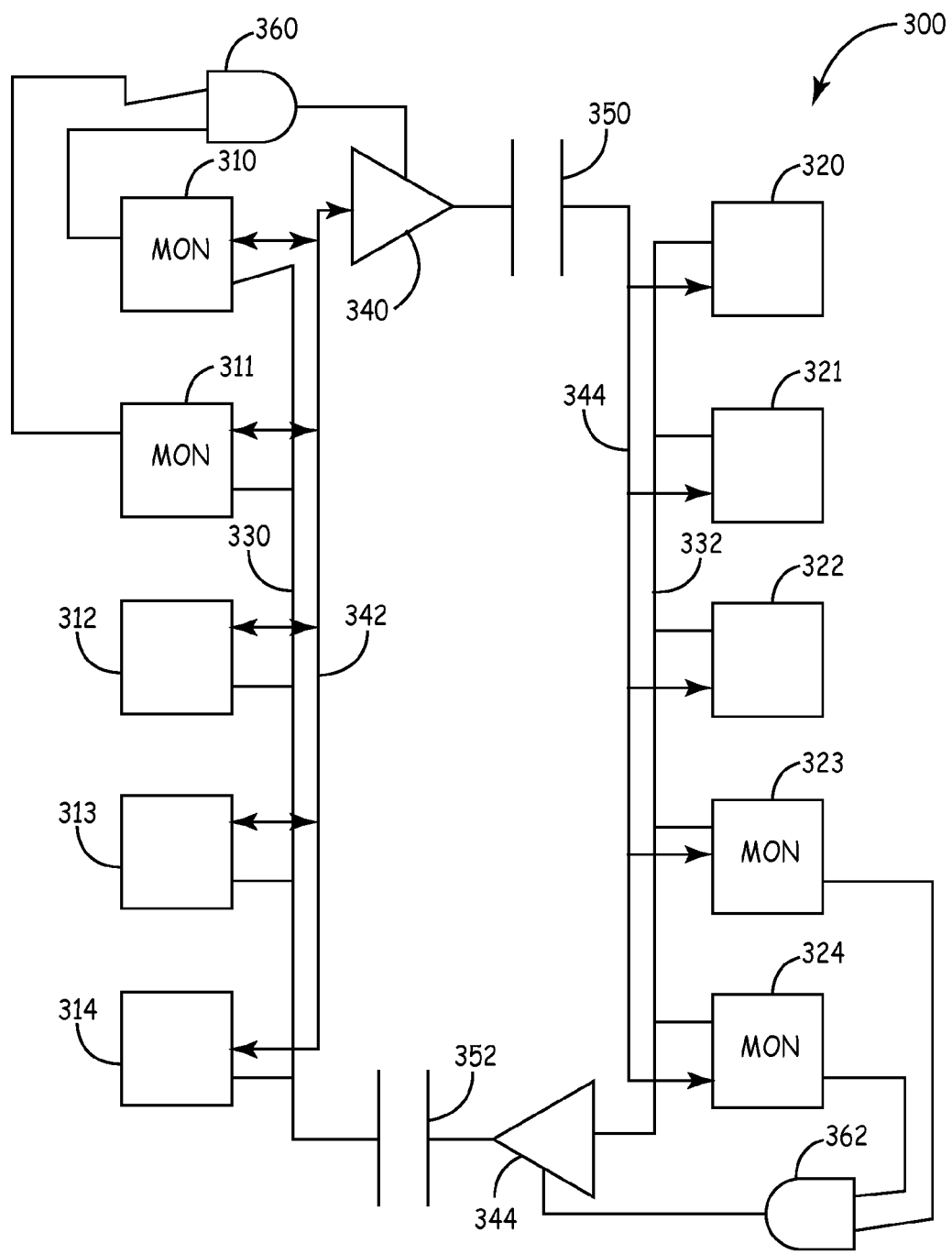
FIG. 3 is a block diagram illustrating a self-seeking driver enable system for lane fail-silence.

FIG. 3 is a block diagram illustrating a self-seeking driver enable system 300 for lane fail-silence according to another embodiment. Such an implementation can be employed to enhance the integration logic when using TTP. In TTP an invalid protocol state frame, e.g., a CS or I or X-Frame can erroneously mislead integrating nodes. This is particularly problematic in the dual lane configuration as the lane is supposed to be a fault-propagation boundary. To mitigate this problem without introducing central guardian actions, the present protocol can be extended to implement a command/monitor architecture to contain protocol state failures. In general, this requires the following behavior: 1) certain nodes in the system are configured to be monitors for protocol state; 2) nodes that are configured as protocol state monitors continuously monitor all transmissions on a bus; and 3) if a monitoring node detects an erroneous protocol state transmission, the node invalidates the transmission before the frame's integrity check is propagated to the other lane.

As shown in FIG. 3, the driver enable system 300 is implemented as part of a dual lane architecture in which a first lane includes a plurality of nodes 310, 311, 312, 313, 314, and a second lane includes a plurality of nodes 320, 321, 322, 323, 324. The nodes 310 and 311 are configured to be monitors (MON) in the first lane, and nodes 323 and 324 are configured to be monitors in the second lane. The nodes 310-314 are in communication with each other through a first bus 330, and nodes 320-324 are in communication with each other through a second bus 332.

The nodes 310-314 are in also in communication with a first repeater 340 through a third bus 342, and nodes 320-324 are in communication with a second repeater 344 through bus 332. The repeaters supply sufficient spatial and physical fault mitigation such that a listen only bus on one lane can be destroyed without impacting the other lane. A first electrical isolator 350 is interposed between the output of repeater 340 and a fourth bus 344. The bus 344 provides a connection to each of nodes 320-324. A second electrical isolator 352 is interposed between the output of repeater 344 and bus 330.

An output of each of monitor nodes 310 and 311 is directed to respective inputs of a first logic gate 360 (e.g., AND gate), which has an output in communication with repeater 340. An output of each of monitor nodes 323 and 324 is directed to respective inputs of a second logic gate (e.g., AND gate), which has an output in communication with repeater 344. This configuration provides a cross-lane transmission enable between the first and second lanes.

During operation of driver enable system 300, a single faulty node in one lane is prevented from enabling and sending an invalid frame to the other lane, since the cross-lane transmission enable is a function of two monitor nodes. The driver enable system is turned off before transmission of the erroneous frame is completed. Hence, the receiving nodes on the other lane simply get a detectable faulty frame and thus do not integrate. It should be noted that the monitor nodes monitor all transmissions, not just the scheduled protocol state transmission. If any frame indicates an erroneous protocol state, the frame is truncated/destroyed.

The driver enable system 300 provides a fail-passive interface in relation to the protocol failure at the inter-lane interface in a dual lane architecture. Hence, issues of system availability in relation to protocol failure are mitigated.

In another method to invalidate a frame, which can be used in conjunction with driver enable system 300, the monitor nodes can be configured to force the bus to insert a line encoding error if a dominant-recessive bus is utilized. This method can also invalidate the frame locally.

Start-up is another area where integration can fail. To resolve issues during start-up, the inter-lane interface is disabled until the frame monitoring functionality is on-line. The invalid start-up messages are prevented from propagating across the inter-lane interface.

Cross-lane cliques are another area where the dual lane system can fail. To resolve this, a standard lane with a discrete control signal can be added to indicate which of the two lanes is in control. By using such a discrete control signal, if a lane detects a cross-lane clique scenario and is not in control, the lane forces the nodes to re-integrate using the traffic from the other lane.

In some scenarios, it may not be possible to re-integrate due to a repeater or other failure. To account for this, a further modification to the present system can be made to entirely remove the need for a discrete control signal. In this modification, the protocol can be used by providing the health/membership status of all nodes to be visible. This can be similar to the TTP.C membership protocol with the difference that the node health/membership status of different nodes is channel specific. Observing this vector, a lane would be able to gauge the operational health of the nodes of the other channel.

Referring to FIG. 3, if a single fault occurs such that nodes 310-314 (first lane) are not receiving messages from nodes 320-324 (second lane), but the second lane does receive messages from the first lane, then a clique would be present. In order to assure that both the first lane and second lane do not attempt to control a target system, one lane must transition to active standby. In this instance, the first lane has no way of knowing if the second lane is present and a repeater failure exists, or if for some other reason, such as a power supply problem, the second lane is off-line. As such, the first lane nodes will be actively controlling the target system. Concurrently, the second lane nodes will know that they are not being acknowledged (heard) by the first lane, and logic within the second lane will cause a transition of all nodes in the second lane into a hot standby mode. In this case, the second lane will not control the target system, and will be prepared to take control if the first lane drops out due to a second failure. It should be noted that as this logic is redundant in both lanes, the converse scenario would be true as well.

Figure 4:
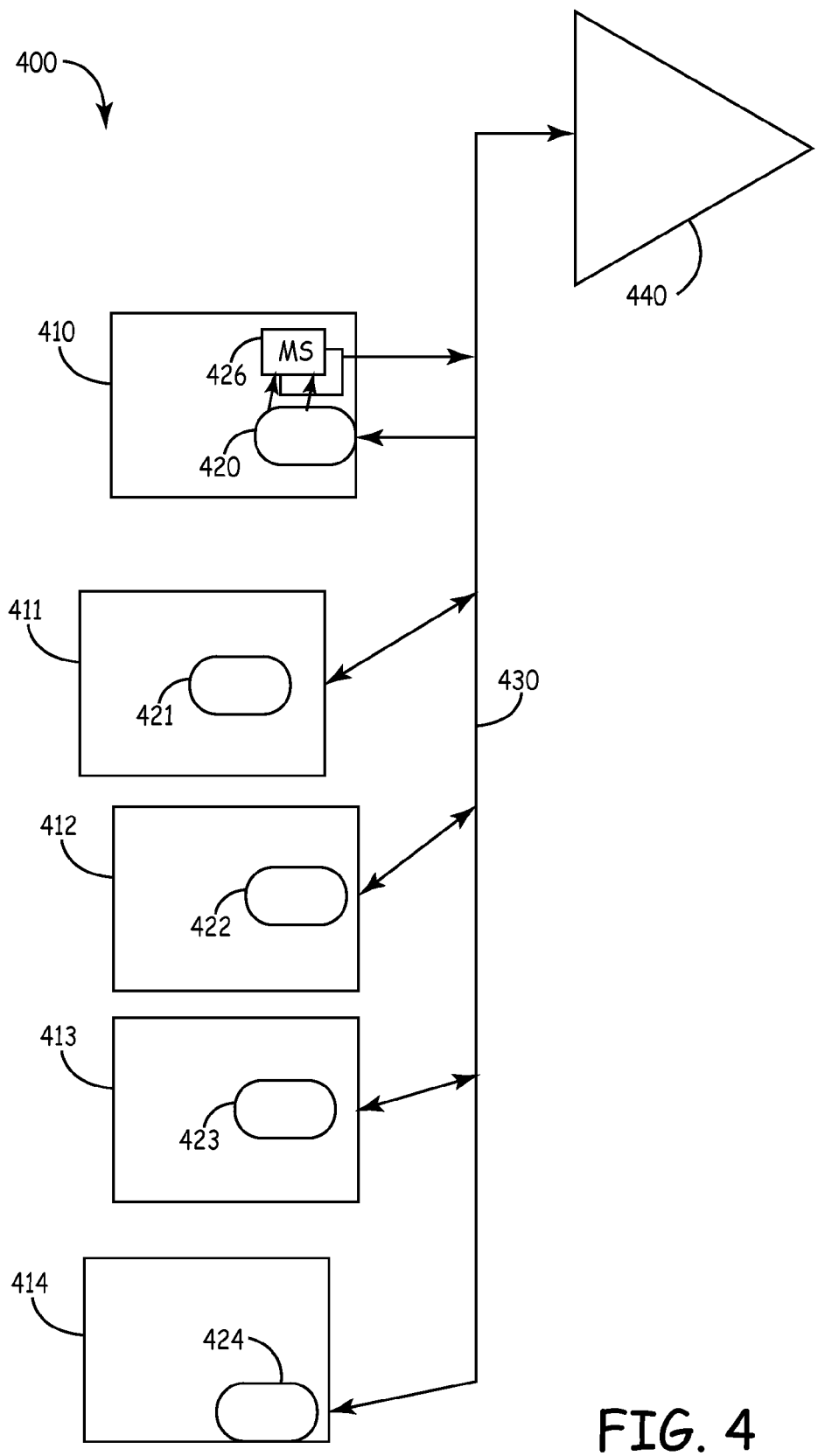
FIG. 4 is a block diagram illustrating a listen-only monitor system.

FIG. 4 is a block diagram illustrating a single, listen-only monitor system 400 according to another embodiment. The monitor system 400 is configured for monitoring protocol signal transmissions of all nodes in a first lane of a dual lane architecture system. As shown in FIG. 4, the first lane includes a plurality of nodes 410, 411, 412, 413, 414. The node 410 is configured as a monitor node for the first lane, and includes a listen-only monitor integrated circuit (IC) 420. The other nodes 411-414 are configured to provide normal communications, and respectively include corresponding ICs 421, 422, 423, 424, which provide for transmission and reception at the nodes 411-414.

The nodes 410-414 are in communication with each other through a bus 430. The nodes 410-414 are in also in communication with a repeater 440 through bus 430. A second lane in the dual lane architecture system can have a similar node/bus/repeater configuration as depicted in FIG. 4.

During operation of monitor system 400, node 410 listens to all data frames transmitted by the local lane and triggers a mono-stable (MS) driver 426 to truncate or disrupt any erroneous transmissions by forcing an erroneous bus encoding violation. For example, if an erroneous frame on bus 430 is detected by monitor IC 420, the MS driver 426 is enabled by monitor IC 420. The MS driver 426 generates a bus pulse to wipe out the ongoing transmission by forcing the bus into a dominant state. It should be noted that the monitor node only monitors a frame up to the cyclic redundancy check (CRC), i.e., before the CRC sine errors in the CRC would result in a detectable faulty frame.

One concern for monitor system 400 is that an erroneous monitor node could modulate the traffic on the network to produce an erroneous good message. To prevent this, an independent mono-stable driver is interposed between the monitor node and a network signaling transceiver. The period of the pulse generated by the independent mono-stable driver is sufficient to force a line encoding error on the bus. The period is longer than bit encoding on the bus to prevent erroneous modulation. Hence, the ability of the erroneous monitor node to modulate the bus is removed.

Instructions for carrying out the various process tasks, calculations, and generation of signals and other data used in the operation of the system and method of the invention can be implemented in software, firmware, or other computer readable instructions. These instructions are typically stored on any appropriate computer readable medium used for storage of computer readable instructions or data structures. Such computer readable media can be any available media that can be accessed by a general purpose or special purpose computer or processor, or any programmable logic device.

Suitable computer readable media may comprise, for example, non-volatile memory devices including semiconductor memory devices such as EPROM, EEPROM, or flash memory devices; magnetic disks such as internal hard disks or removable disks; magneto-optical disks; CDs, DVDs, or other optical storage disks; nonvolatile ROM, RAM, and other like media. Any of the foregoing may be supplemented by, or incorporated in, specially-designed application-specific integrated circuits (ASICs). When information is transferred or provided over a network or another communications connection (either hardwired, wireless, or a combination of hardwired or wireless) to a computer, the computer properly views the connection as a computer readable medium. Thus, any such connection is properly termed a computer readable medium. Combinations of the above are also included within the scope of computer readable media.

The present invention may be embodied in other specific forms without departing from its essential characteristics. The described embodiments and methods are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A network for a dual lane control system, the network comprising:
   at least one hub for a first channel;
   at least one hub for a second channel;

a first plurality of end nodes in a first lane, each of the first plurality of end nodes coupled to the first and second channels by being in direct communication with each of the hubs for the first and second channels; and a second plurality of end nodes in a second lane that are each redundant with a respective end node in the first lane, each of the second plurality of end nodes coupled to the first and second channels by being in direct communication with each of the hubs for the first and second channels;

wherein a pair of redundant end nodes is configured to simultaneously transmit and receive within a single time slot using the first channel and the second channel, with one channel for transmitting and the other channel for receiving.

2. The network of claim 1, wherein the at least one hub for the first channel comprises a first hub coupled to a second hub, and the at least one hub for the second channel comprises a third hub coupled to a fourth hub.

3. The network of claim 2, wherein the first plurality of end nodes are in direct communication with the first hub and the third hub.

4. The network of claim 2, wherein the second plurality of end nodes are in direct communication with the second hub and the fourth hub.

5. The network of claim 1, wherein the network has a time-triggered network architecture.

6. The network of claim 5, wherein the network architecture uses time-division multiple access.

7. The network of claim 1, wherein the pair of redundant end nodes are mapped into the time slot by utilizing a single physical layer for each of the redundant end nodes.

8. The network of claim 1, wherein the control system comprises a MAC-based FADEC system, or a cabin pressure control system.

9. A method for communicating in a network for a dual lane control system, the network comprising:
   at least one hub for a first channel;
   at least one hub for a second channel;
   a first plurality of end nodes in a first lane, each of the first plurality of end nodes coupled to the first and second channels by being in direct communication with each of the hubs for the first and second channels; and
   a second plurality of end nodes in a second lane that are each redundant with a respective end node in the first lane, each of the second plurality of end nodes coupled to the first and second channels by being in direct communication with each of the hubs for the first and second channels;

the method comprising:
   mapping a pair of redundant end nodes into a single time slot, wherein one of the pair of redundant end nodes communicates on the first channel and the other of the pair of redundant end nodes communicates on the second channel.

10. The method of claim 9, further comprising calculating membership independently for each end node in the time slot.

11. The method of claim 10, wherein lane control is achieved through software awareness of the membership and associated clique formation.

12. A driver enable system for a network with a dual lane architecture, the system comprising:
   a first plurality of nodes in communication with each other in a first lane, wherein at least two of the first plurality of nodes are configured to be monitor nodes in the first lane;
   a second plurality of nodes in communication with each other in a second lane; wherein at least two of the second plurality of nodes are configured to be monitor nodes in the second lane;
   a first repeater in communication with the first plurality of nodes;
   a first logic gate in communication with the first repeater;
   a second repeater in communication with the second plurality of nodes; and
   a second logic gate in communication with the second repeater.

13. The system of claim 12, wherein the monitor nodes in the first lane are each in communication with respective inputs of the first logic gate, and the monitor nodes in the second lane are each in communication with respective inputs of the second logic gate.

14. The system of claim 12, wherein the first and second logic gates are AND gates.

15. The system of claim 12, wherein the monitor nodes are configured to provide a cross-lane transmission enable between the first and second lanes such that a single faulty node in one lane is prevented from enabling and sending an invalid frame to the other lane.

16. The system of claim 12, further comprising a dominant-recessive bus coupled to the monitor nodes, wherein the monitor nodes are configured to force the bus to insert a line encoding error to invalidate an erroneous frame.

17. A monitor system for a network with a dual lane architecture, the system comprising:
   a plurality of end nodes in communication with each other in a local lane;
   a monitor node in communication with the end nodes of the local lane such that the monitor node only listens to protocol signal transmissions from the end nodes;
   a repeater in communication with the plurality of end nodes and the monitor node; and
   a mono-stable driver in communication with the monitor node;
   wherein the monitor node listens to all data frames transmitted by the local lane and triggers the mono-stable driver to disrupt any erroneous data transmissions.

18. The system of claim 17, wherein the end nodes are in communication with each other and the monitor node through a bus.

19. The system of claim 18, wherein the repeater is in communication with the plurality of end nodes and the monitor node through the bus.

* * * * *